(12) United States Patent
Donohue

(10) Patent No.: US 12,078,305 B2
(45) Date of Patent: Sep. 3, 2024

(54) INTEGRATED LIGHT-REFLECTING MIRROR SYSTEM AND METHOD

(71) Applicant: GloryMakeup Inc., Taipei (TW)

(72) Inventor: Daniel Ariel Donohue, Miami, FL (US)

(73) Assignee: GloryMakeup Inc., Taipei (TW)

( * ) Notice: Subject to any disclaimer, the term of this patent is extended or adjusted under 35 U.S.C. 154(b) by 0 days.

(21) Appl. No.: 18/173,969

(22) Filed: Feb. 24, 2023

(65) Prior Publication Data

US 2023/0280004 A1  Sep. 7, 2023

Related U.S. Application Data

(60) Provisional application No. 63/316,171, filed on Mar. 3, 2022.

(51) Int. Cl.
| | |
|---|---|
| *F21S 4/22* | (2016.01) |
| *F21S 8/00* | (2006.01) |
| *F21V 23/00* | (2015.01) |
| *F21Y 115/10* | (2016.01) |
| *F21W 131/302* | (2006.01) |

(52) U.S. Cl.
CPC . *F21S 4/22* (2016.01); *F21S 8/03* (2013.01); *F21V 23/004* (2013.01); *F21W 2131/302* (2013.01); *F21Y 2115/10* (2016.08)

(58) Field of Classification Search
CPC ................. A47G 1/02; F21S 4/22; F21S 8/03
See application file for complete search history.

(56) References Cited

U.S. PATENT DOCUMENTS

| | | | | |
|---|---|---|---|---|
| 2020/0008592 A1* | 1/2020 | Meyers | ...................... | G06F 3/02 |
| 2020/0278514 A1* | 9/2020 | Yang | ...................... | F16M 11/06 |

FOREIGN PATENT DOCUMENTS

| | | |
|---|---|---|
| CN | 201097042 Y | 8/2008 |
| CN | 209995575 U | 1/2020 |
| CN | 214501110 U | 10/2021 |

OTHER PUBLICATIONS

International Search Report and Written Opinion, PCT/CN2023/079238, mailed Jul. 12, 2023.

* cited by examiner

*Primary Examiner* — Karabi Guharay
(74) *Attorney, Agent, or Firm* — Tong J. Lee

(57) ABSTRACT

A mirror assembly includes a transparent rim that surrounds a display. The rim has an outer perimeter and an inner perimeter, where the inner perimeter defines a hollow center. The rim has an angled edge surrounding the outer perimeter at a back side, and a raised edge that protrudes forward to define an edge's front surface that surrounds the outer perimeter of the rim at a front side. The display covers the front side of the hollow center of the rim. The display includes a digital display panel. Light sources disposed behind the display project light that propagates from the inner perimeter of the rim radially outwards within the rim. The light is re-directed by the angled edge to exit the rim from the edge's front surface.

20 Claims, 8 Drawing Sheets

INTEGRATED LIGHT-REFLECTING MIRROR SYSTEM AND METHOD

CROSS-REFERENCE TO RELATED APPLICATIONS

This application claims the benefit of U.S. Provisional Application No. 63/316,171 filed on Mar. 3, 2022.

TECHNICAL FIELD

Embodiments of the invention relate to a mirror system including a transparent rim and light sources to produce a floating halo effect.

BACKGROUND OF THE INVENTION

Proper lighting is crucial for makeup applications. To avoid an uneven, insufficient, or excessive application of makeup, a user needs to see clearly his/her facial features, skin, and the color and texture of the cosmetics. Additionally, good lighting can help the user to detect any imperfections or blemishes that may need extra coverage.

Lighted vanity mirrors available on the market today often do not have adjustable lighting. The mirror light is either not bright enough for makeup application in a dimly lit room, or too bright and harsh for a user's eyes. The light is typically emitted directly towards a user's eyes, causing eye strains and glare on the mirror. Moreover, conventional vanity mirror designs are typically very thick due to the bulkiness of the light source facing the user. Therefore, there is a need for improving the existing lighted mirrors.

SUMMARY OF THE INVENTION

In one embodiment, an apparatus of a mirror assembly includes a transparent rim. The rim has an outer perimeter and an inner perimeter that defines a hollow center. The rim has an angled edge surrounding the outer perimeter at a back side, and a raised edge that protrudes forward to define an edge's front surface that surrounds the outer perimeter of the rim at a front side. The apparatus also includes a display, which further includes a digital display panel that covers the front side of the hollow center. The apparatus also includes light sources disposed behind the display to project light that propagates from the inner perimeter of the rim radially outwards within the rim. The light is re-directed by the angled edge of the rim to exit the rim from the edge's front surface.

In another embodiment, an apparatus includes a transparent rim. The rim has an outer perimeter and an inner perimeter that defines a hollow center. The rim has an angled edge surrounding the outer perimeter at a back side, and a raised edge that protrudes forward to define an edge's front surface that surrounds the outer perimeter of the rim at a front side. The apparatus also includes light sources disposed in the hollow center of the rim to project light that propagates from the inner perimeter of the rim radially outwards within the rim. The light is re-directed by the angled edge of the rim to exit the rim from the edge's front surface.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

Figure 1:
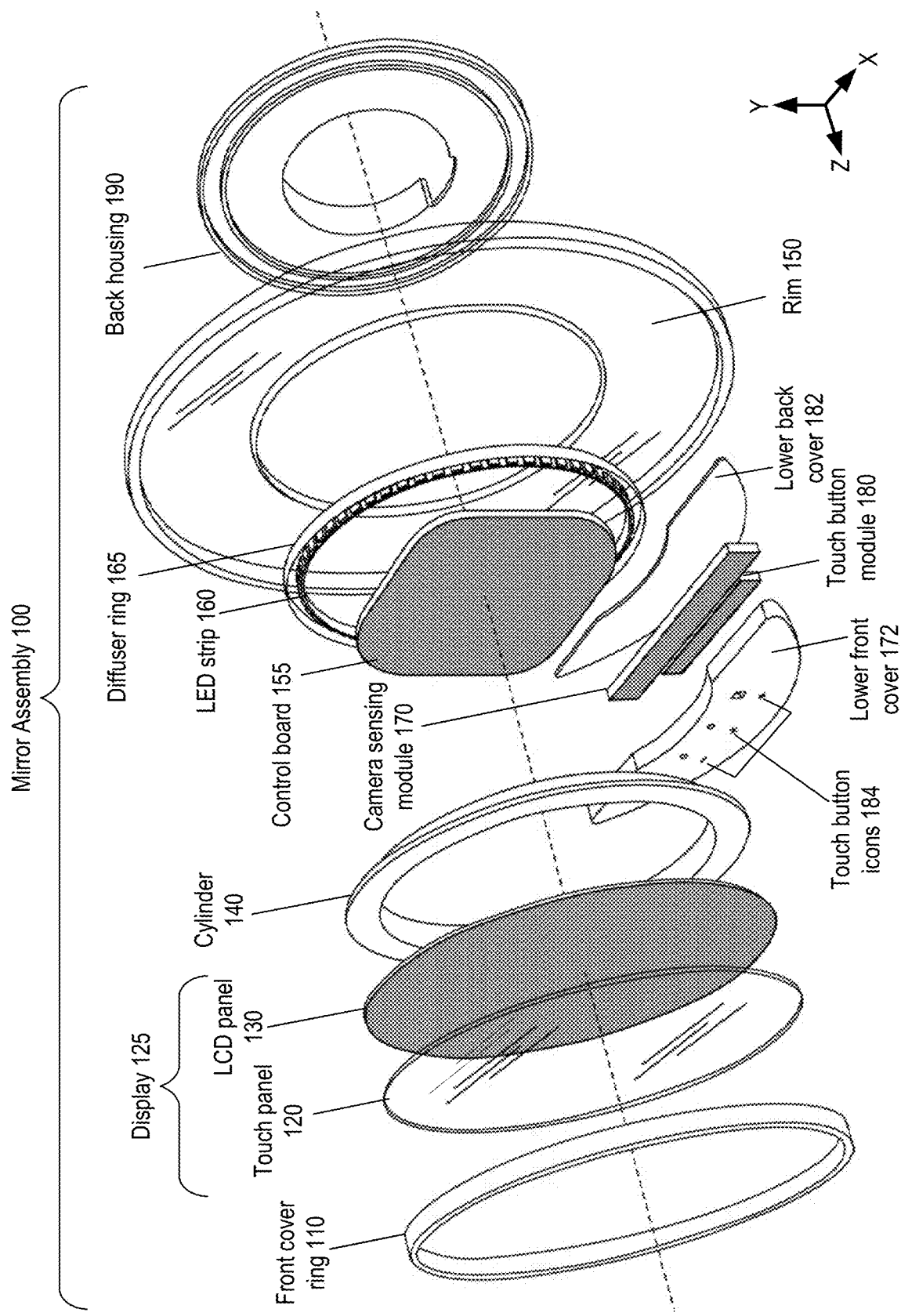
FIG. 1 illustrates an exploded view of a mirror assembly according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The disclosed mirror assembly utilizes a unique lighting technique and apparatus to project uniform and diffused lights at a user. The mirror assembly can be used for makeup applications. In one embodiment, the mirror assembly includes a transparent rim. When a user turns on the mirror light, the outer edge of the rim emits diffused and reflected light toward the user while the inner area of the rim appears unlit to the human eye. The lighted rim edge creates a visual effect of a floating halo, which is smooth and pleasing to the eye. The user does not see any wires or light sources in the transparent rim. The front and rear face of the rim stays transparent whether the light is on or off. This transparency creates a visual illusion of slimness than the actual dimensions of the mirror, as humans generally cannot perceive the thickness of a transparent object.

For ease of explanation, the term "front" refers to the user-facing side and the term "back" faces away from the user. In one embodiment, the mirror assembly includes a digital display panel. In another embodiment, a viewing surface such as a reflective mirror, with or without magnification, may be used instead of a digital display panel. In one embodiment, the display panel is positioned at the center or substantially at the center of the rim. Both the display panel and the rim may have a round shape. In some embodiments, the lighting apparatus described herein can be used with or without a display (or viewing surface) for a wide range of applications not limited to makeup applications. In some embodiments, the lighting apparatus described herein can be packaged and sold as a standalone module without a display or a viewing surface.

A ring of light sources, e.g., a light-emitting diode (LED) strip is arranged into a ring shape and positioned behind the display panel. The LED light may be a white light of any color temperature, red green blue (RGB) light, or another type of light. The LED light may be dimmable. In one embodiment, each LED light source is covered with a light diffuser to create a light diffusion effect.

In one embodiment, the front side of the rim includes one or more indented areas and channels to house electronic circuitry and to route wires. The electronic circuitry may include one or more cameras to capture the image of the user. The captured image can be displayed on the display panel. The electronic circuitry may further include a touch button module to receive user input such as power on/off and adjustment to light intensity, color temperatures, etc. Additional electronic circuitry may also be included.

Conventional makeup mirrors typically include light sources at the front side of the mirror frame to directly project light onto a user's face. This light source position causes the conventional mirror to appear bulky and heavy, and the direct light projection can be too harsh to the user's eyes. The disclosed mirror assembly combines a thin mirror with the functions and features of a smart device. Functions and features can be added to the central core of the mirror assembly while keeping the thinness of the mirror. With the transparent rim, the disclosed mirror assembly has a visual appearance of being much thinner compared to conventional makeup mirrors. This is because the rim is transparent when unlit, and when it is lit only the front side of the outer edge lights up. The transparent rim easily blends with its surroundings and makes the mirror look smaller than it actually is.

FIG. 1 illustrates an exploded view of an integrated light-reflecting mirror assembly 100 (also referred to as mirror assembly 100) according to one embodiment. The mirror assembly 100 includes a front cover ring 110, which is a hollow ring that goes over to cover the outer perimeter of a touch panel 120 and a digital display panel. An example of a digital display panel is a liquid crystal display (LCD) panel 130. The front cover ring 110 connects via threaded or snap points to a cylinder 140. The front of the cylinder 140 is a circular ring that can be tightened onto the front cover ring 110. The touch panel 120 and the LCD panel form a touch-sensing display (referred to as display 125). However, it is understood that the term "display" as used herein may include any digital display panel with and without a touch panel.

The mirror assembly 100 also includes a rim 150 made of a transparent material. In one embodiment, the rim 150 is made of a transparent plastic material, such as acrylic. Other transparent materials such as polycarbonate, glass, or crystal may also be used. The rim's inner perimeter defines a hollow center. The back of the cylinder 140 extends through the hollow center of the rim 150. An LED strip 160 and a diffuser ring 165 are placed in respective circular grooves in the cylinder 140. The diffuser ring 165 surrounds the LED strip 160 with an air gap in between. The diffuser ring 165 may be wider than the LED strip 160. When the LED strip 160 is turned on, it projects light radially outwards through the diffuser ring 165.

A control board 155 is behind the display 125 in the hollow center of the cylinder 140. The control board 155 may house multiple integrated circuit components to control the operations of the mirror assembly 100. Non-limiting examples of integrated circuit components include a computer (e.g., integrated processing computer (IPC)), processors, speakers, wireless interface, and I/O connectors for signals from cameras and user inputs, and standard I/O interfaces such as high-definition multimedia interface (HDMI), universal serial bus (USB), and mobile industry processor interface (MIPI) inputs. The MIPI inputs may be used for the display panel 130, the touch panel 120, and inputs for other external add-ons such as a mobile phone and/or auxiliary cameras to enhance the image capturing process be it a photo or a video. The computer on the control board 155 can handle image processing for augmented reality functions that are displayed to the user with a guide on the user's facial image or reflection during a makeup process.

A back housing 190 at the back side of the rim 150 is threaded forming a large nut that can be tightened over the back end of the cylinder 140, eliminating the need for screws and therefore making the manufacturing process easier. Alternatively, the back housing 190 can click to or attach to the back end of the cylinder 140. A back cover may cover the back side of the back housing 190. The back housing 190 provides a passageway for cables and space for a mounting mechanism to mount a support arm that holds the mirror assembly 100. A rear fixture such as a partial screw insert, twist and click-to-hold means that does not extend into the rim 150 can be used to attach the back cover to multiple types of stands. The rear fixture can also be fitted with an industry-standard VESA mount to use a type of stand from third-party manufacturers. A user in front of the display 125 cannot see the thickness of the housing at the center back, so the overall appearance of the mirror assembly 100 to the user is that the mirror assembly 100 is only as thin as the rim 150.

The front of the cylinder 140 has a ring shape with a diameter greater than the diameter of the rim's hollow center. The back end of the cylinder 140 extends through the rim's hollow center to reach the front end of the back housing 190. The back housing 190 can be threaded onto or clicked to the back end of the cylinder 140. When the front cover ring 110 is also tightened onto the front ring of the cylinder 140, the rim 150 can be pressed firmly in place without a single screw drilling into the rim 150. The absence of screws in the rim 150 prevents any disruption to the light propagation within the rim 150.

In one embodiment, the mirror assembly 100 includes a camera sensing module 170 and a touch button module 180 at the lower part of the rim's front side. The camera sensing module 170 includes one or more cameras for image capturing. In some embodiments, the camera sensing module 170 can also perform depth sensing, image recognition, and/or other types of imaging and sensing tasks. The camera sensing module 170 may include a depth-sensing camera module to capture a user's 3D facial profile. Additional camera(s) may be connected to the control board 155 as necessary. The camera sensing module 170 may be a proprietary or an off-the-shelf electronic component. A microphone may be co-located with the camera sensing module 170.

The touch button module 180 provides a number of touch buttons to receive user input such as mirror light control. The mirror light control provided by the touch button module 180 may include LED light temperature control (e.g., 2500K-5500K) to have a more yellow or more white light, brightness intensity adjustment, light on/off, and/or a cycle function to cycle through a number of light settings. In one embodiment, the LED light intensity and/or color temperature can change according to the user's input to the touch button module 180. In one embodiment, the LED light intensity and/or color temperature can change automatically according to the sensor input; e.g., sensors in the camera sensing module 170.

The touch button module 180 provides a hardware-based control for controlling the LED light. The touch button module 180 may operate independently of the touch panel 120. Using the touch button module 180 to control light is faster than the software control on the touch panel 120. This is because the touch panel 120 operations rely on the underlying software, which is much slower than the hardware-based touch button module 180. Furthermore, when the processors (e.g., the IPC) on the control board 155 are powered off or in sleep mode, the touch panel 120 cannot respond to any user input. The touch button module 180 offers users physical buttons for LED light control without waking up the processors. When the processors are turned on and awake, the processors can execute software to adjust the LED light automatically. The intensity and/or temperature of the LED light can be automatically adjusted based on the amount of ambient light and/or the task at hand. For example, the mirror assembly 100 may be attached to an automatic makeup machine (e.g., the makeup machine 550 in FIG. 5). During the makeup application process, some makeup steps (e.g., facial contour, eye makeup, lip makeup, etc.) may require higher precision than others and therefore more lights for the cameras to detect the precise position of the target area. Moreover, the intensity and/or color of the LED light may be adjusted based on what is displayed on the LCD panel 130. For example, when the display 125 displays a user's facial image with augmented reality (AR) superimposed thereon, the LED light may be automatically dimmed. The software-based light control, which is executed by the processors on the control board 155, can automatically adjust the LED light as well as the LCD panel 130 brightness to support the need or requirement of the software applications being executed.

In one embodiment, the camera sensing module 170, the touch button module 180, the touch panel 120, microphones, sensors, and other input/output modules are electrically coupled to the control board 155. The control board 155 may receive signals from these modules for processing, and send control signals to the modules for controlling their operations. For those modules located at the front side of the rim 150, electrical wires may be routed from behind the display 125 through the hollow center of the rim 150 via spacing between adjacent LED lights to reach the control board 155.

In one embodiment, the camera sensing module 170 and the touch button module 180 are covered by a lower front cover 172 and a lower back cover 182 to hide the circuits and wires of the modules 170 and 180 from view. The lower back cover 182 may be a piece of non-transparent film attached to the front or back side of the rim 150 by adhesive. The lower front cover 172 includes a number of holes to allow input signals (e.g., image, voice, etc.) to reach the camera sensing module 170 and a number of touch button icons 184 to indicate the functions of the corresponding touch buttons. In alternative embodiments, the camera sensing module 170 and/or the touch button module 180 may be located at a different part of the rim 150 than what is shown in FIG. 1, or may be located at another part of the mirror assembly 100. For example, the touch buttons module 180 may be located at the outer perimeter of the front cover ring 110. The camera sensing module 170 may be located on the upper front side of the rim 150 or another part of the mirror assembly 100. In one embodiment, the camera sensing module 170, the touch button module 180, and/or wires connecting these modules to the control board 155 may be embedded in the rim 150, such as indented areas or channels at the front side of the rim 150. The depth of these indented areas and channels is less than the thickness of the rim 150. An alternative embodiment of a rim with indented areas and channels is described with reference to FIG. 6-FIG. 11.

In one embodiment, the LCD panel 130 serves as an interactive mirror for the user. A 3D facial profile of the user can be captured by the camera sensing module 170 (which performs depth-sensing) and displayed on the LCD panel 130. The LCD panel 130 may also be connected to a processor (e.g., located in the control board 155), which performs operations including the operations based on the input from the camera sensing module 170, the touch module 180, and the touch panel 120. With a wireless network interface (e.g., Bluetooth, Wi-Fi, etc.), the LCD panel 130 can also serve as a computer and/or smart device display to display information from the Internet as well as interactive message exchanges between the user and another person or entity. The user may control the mirror assembly 100 by voice input to the microphone 175.

The LCD panel 130 displays a digital image, which may be a digital image of the user, an augmented reality (AR) digital image (e.g., a makeup or styling choice superimposed on the user's image), an image or image sequence (e.g., a video) recommended for or selected by the user, a real-time online consulting session with a makeup coach or another party of interest to guide the user in the makeup process, a website, a social media site, images provided by a graphical interface (GUI), and the like. Although the LCD panel 130 is described and shown, in an alternative embodiment, the display 125 may include a mirror (i.e., a reflective surface with or without magnification) instead of a digital display. In another embodiment, the display 125 may include a semi-transparent reflective mirror on top of the LCD panel 130.

Figure 2:
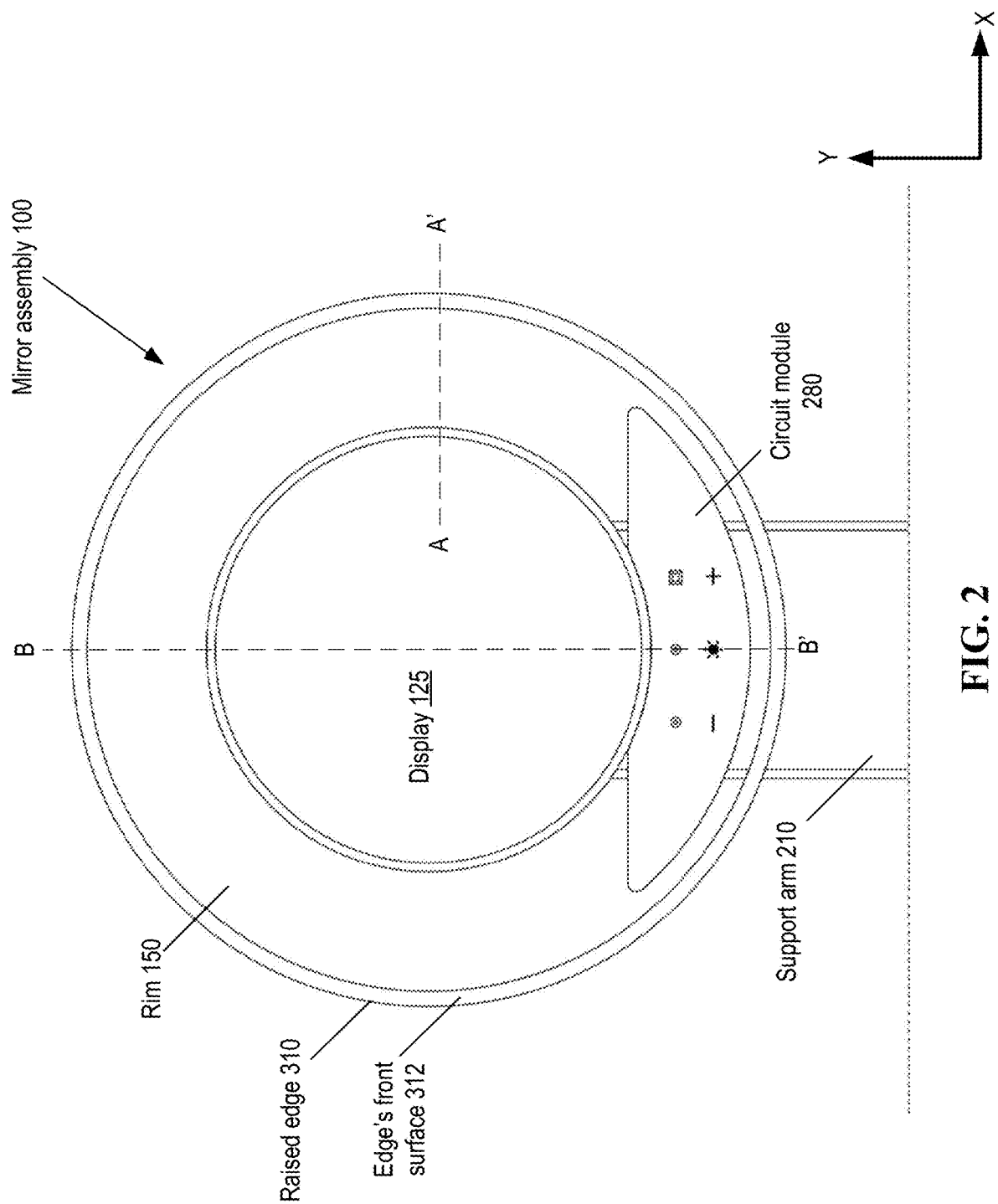
FIG. 2 is a front view of the mirror assembly of FIG. 1 according to one embodiment.

FIG. 2 is a front view of the mirror assembly 100 according to one embodiment. Referring to FIG. 1 and FIG. 2, the display 125 covers the hollow center of the rim 150. The rim 150 has a raised edge 310 around the outer perimeter. The raised edge 310 protrudes towards the front. The front surface of the raised edge is referred to as the edge's front surface 312, from where the LED light is emitted. A circuit module 280 including the camera sensing module 170 and the touch button module 180 is attached to the lower part of the rim 150. In this embodiment, the edge of the circuit module 280 does not extend to the raised edge, so the transparent rim is visible all around the circuit module 280. There are no cables or wires from the circuit module 280 going to the raised edge 310. The circuit module 280 may be held in place by attaching to the cylinder 140 or the front cover ring 110 (FIG. 1). A support arm 210 may be attached to the back of the mirror assembly 100. The balance of the support arm 210 is centered in the back to support the mirror assembly 100 without showing the girth at the back.

As will be described in more detail with reference to FIG. 3 and FIG. 4, LED light stays invisible when it propagates within the rim 150. The light becomes visible when it exits the rim 150 from the edge's front surface 312. The light projected by the light sources creates a circular floating halo at the edge's front surface 312 surrounding the outer perimeter of the rim 150, with unlit circular space of the rim 150 between the raised edge 310 and the display 125. Thus, when the mirror light is turned on, a user facing the mirror would see neither the LED light source nor the light transmission path. To the user, the visible light comes from the floating halo, which appears to be a magical ring of light that surrounds the display 125.

FIG. 2 also shows a horizontal cut A-A' and a vertical cut B-B' through the rim 150. In the following, FIG. 3 illustrates a cross-sectional view of the mirror assembly 100 exposed by the horizontal cut A-A', and FIG. 4 illustrates a cross-sectional view of the mirror assembly 100 exposed by the vertical cut B-B'. The rim 150 shown in FIG. 4 is symmetric with respect to the dashed center line.

Figure 3:
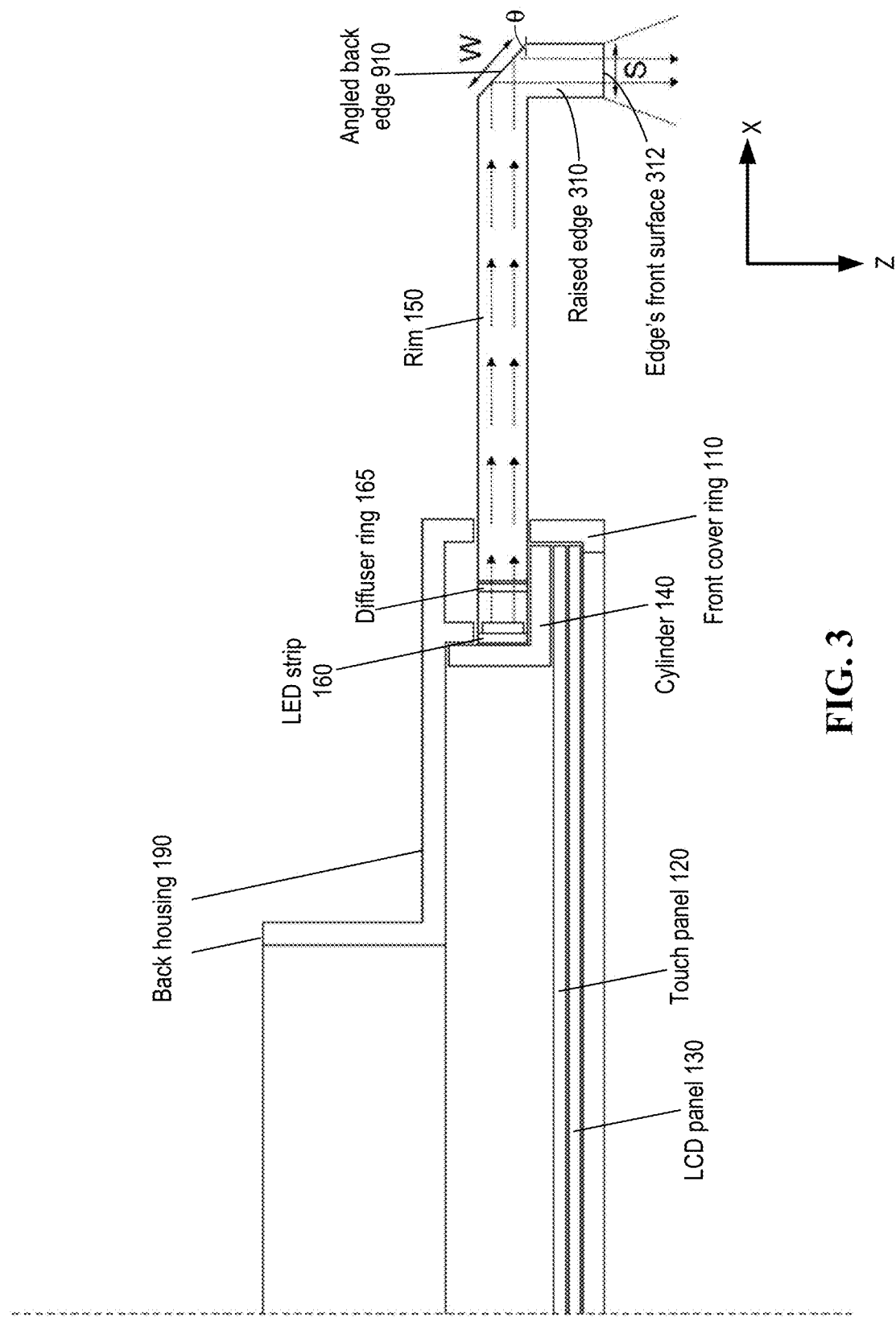
FIG. 3 illustrates a cross-sectional view of the mirror assembly of FIG. 1 exposed by a horizontal cut according to one embodiment.
Figure 4:
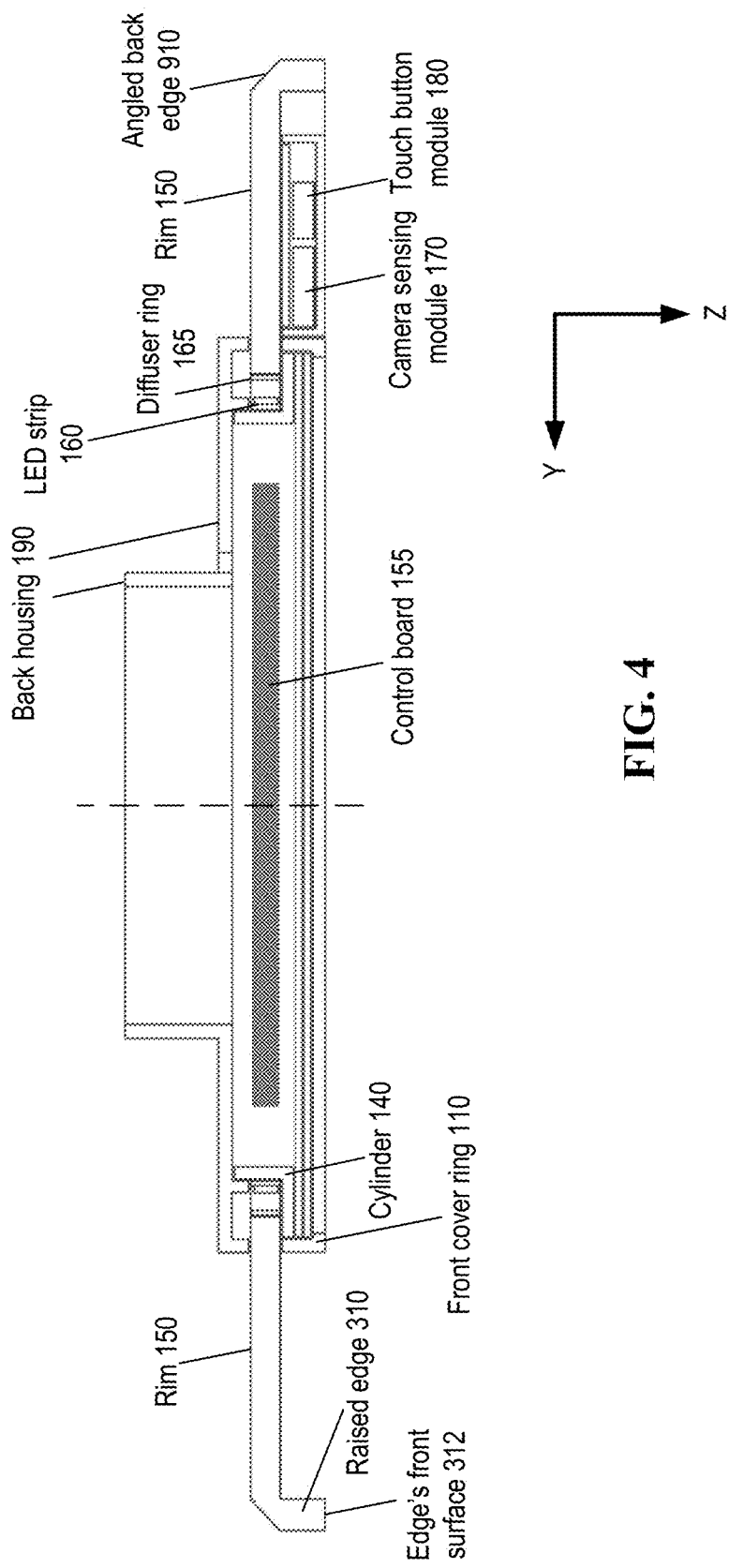
FIG. 4 illustrates a cross-sectional view of the mirror assembly of FIG. 1 exposed by a vertical cut according to one embodiment.

Referring to FIG. 3 and FIG. 4, when a user turns on the mirror light, the LED light projects outwards from behind the display 125 and passes behind the circuit components (e.g., cameras, microphone, touch module, and wires) to reach an angled back edge 910 of the rim 150, and is re-directed (e.g., reflected) by the angled back edge 910 to the raised edge 310 to exit from the edge's front surface 312. The shape of the edge's front surface 312 is the shape of the floating halo seen by a user when the mirror light is turned on.

Non-limiting factors affecting light reflection include the rim material, the geometry of the rim, and the finish of the reflection surface. In one embodiment, the rim 150 is made of acrylics, the reflection angle (θ) is 45 degrees, and the reflection surface is texturized to optimize light reflection. In alternative embodiments with a different rim material and a different reflection surface texture, the reflection angle may be different from 45 degrees. Furthermore, the width (W) of the angled back edge 910 and the size of the reflection angle may be designed based on the desired width (S) of the raised edge 310.

In one embodiment, the light-emitting side of the LED strip 160 is surrounded by the diffuser ring 165 to diffuse and soften the light. With the reflected and diffused LED lighting, the facial image of the user can be captured by cameras in a smooth and uniform light from a suitable distance. The dotted arrows in FIG. 3 indicate the light propagation. The light propagates unobstructed within the rim 150. The rim 150 is formed by a single piece of transparent material. This unobstructed light passage not only is formed by a single piece of transparent material, but is also free of any electrical and mechanical components. Thus, the rim 150 provides an unobstructed light passage from its inner perimeter to the angled back edge 910 and then to the raised edge 310. This unobstructed light passage is L-shaped. The incident light ray leaving the LED strip 160 goes through an air gap to reach the diffuser ring 165, then meets the rim 150, which becomes a light conduit. The incident light ray is reflected by the angled back edge 910 to become an emergent ray coming out of the edge's front surface 312. The reflected light ray while in the conduit of the rim 150 cannot be seen by the eye, maintaining the material's transparency. The entire width (W) of the angled back edge 910 may be coated with one or more materials (e.g., chemicals, films, metals, etc.) and texturized to enhance the light reflection. To manipulate the light reflection and/or refraction, the outer perimeter of the raised edge 310 and continue to the angled back edge 910 may also be coated. The coating may be applied by spray particle methods or by an adhesive. The coating is thin (e.g., 0.1 mm-0.5 mm) and indiscernible to a user facing the mirror assembly 100. In one embodiment, the outer perimeter of the raised edge 310 continuing to the angled back edge 910 may be fitted with a thin ring of edge piece to block any light leaving the sides of the rim 150.

FIG. 4 also shows that the control board 155 may be positioned within the hollow center of the cylinder 140. The control board 155 may be held in place by an attaching mechanism that attaches the control board 155 to the cylinder 140.

Figure 5:
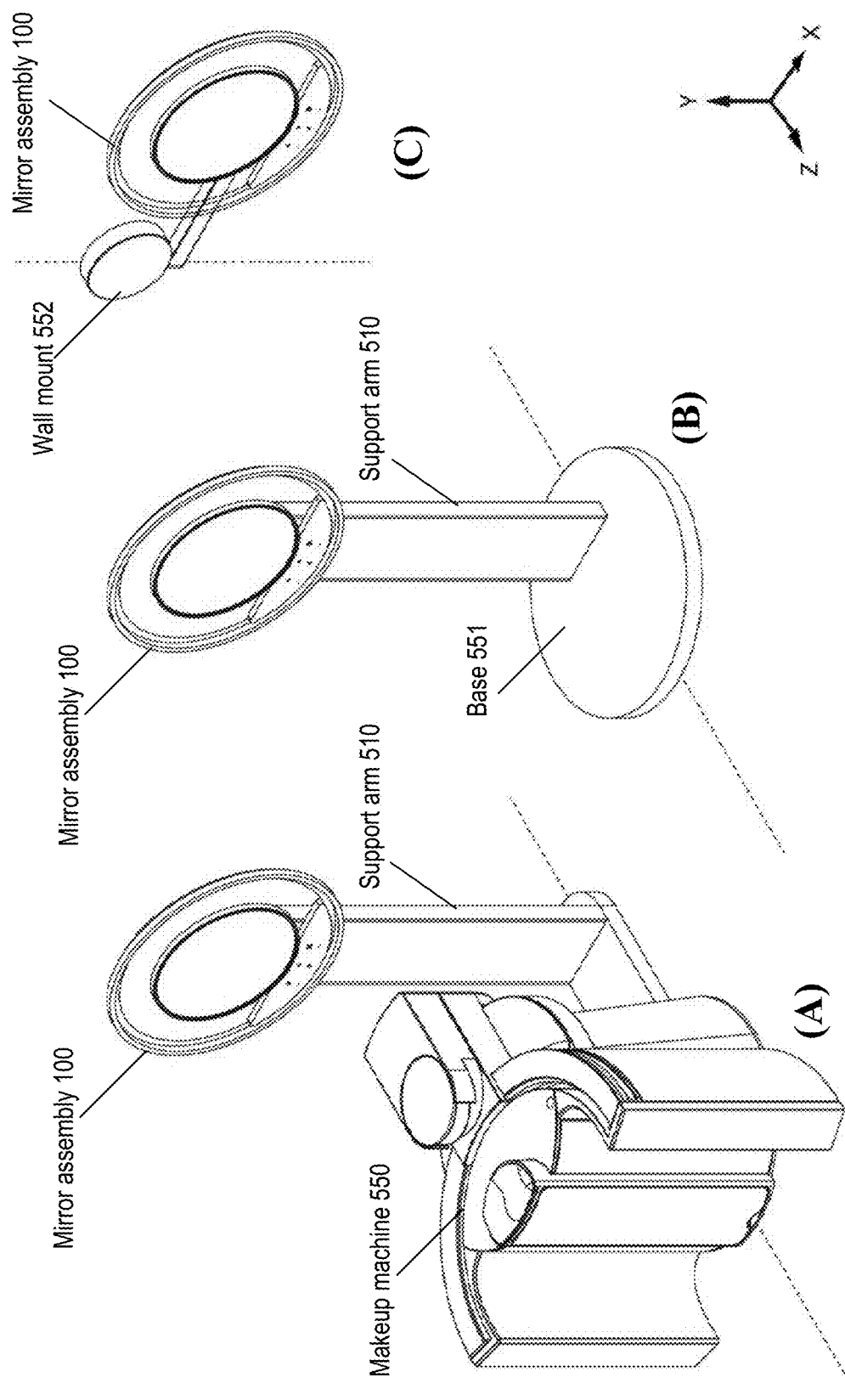
FIG. 5 illustrates the mirror assembly of FIG. 1 in various system configurations according to some embodiments.

FIG. 5 illustrates the mirror assembly 100 in three different system configurations. The mirror assembly 100 in (A) is attached to a machine, such as a makeup machine 550. A makeup machine is disclosed in U.S. patent application Ser. No. 18/049,837 filed on Oct. 26, 2022. It should be noted that multiple embodiments of the makeup machine have been disclosed in the aforementioned patent application; the mirror assembly 100 may be installed on any of the disclosed embodiments or any variations thereof. Thus, the example shown in FIG. 5 is non-limiting.

In (A), the mirror assembly 100 is mounted on a support arm 510 with an adjustable height. The support arm 510 may be secured to the bottom back side of the machine body. In one embodiment, the mirror assembly 100 and the support arm 510 may be packaged and sold as a separate module from the rest of the makeup machine 550.

The mirror assembly 100 in (B) is in a standalone system. In this embodiment, the mirror assembly 100 is mounted on the support arm 510 attached to a base 551 (e.g., a tabletop base). In the embodiments of (A) and (B), some aforementioned electronic components and/or interfaces in the control board 155 may instead be located in the machine 550 of (A) or the base 551 of (B). For example, the machine 550 and/or the base 551 may include a power module and a computing circuit such as an integrated processing computer (IPC). The power module and the IPC are coupled to the control board 155 via cables that go through the support arm 510. The mirror assembly 100 in (C) can be mounted on a wall. In this embodiment, the mirror assembly 100 is mounted on the wall via a wall mount 552 such as an industry-standard VESA mount.

Figures 6, 7, 8:
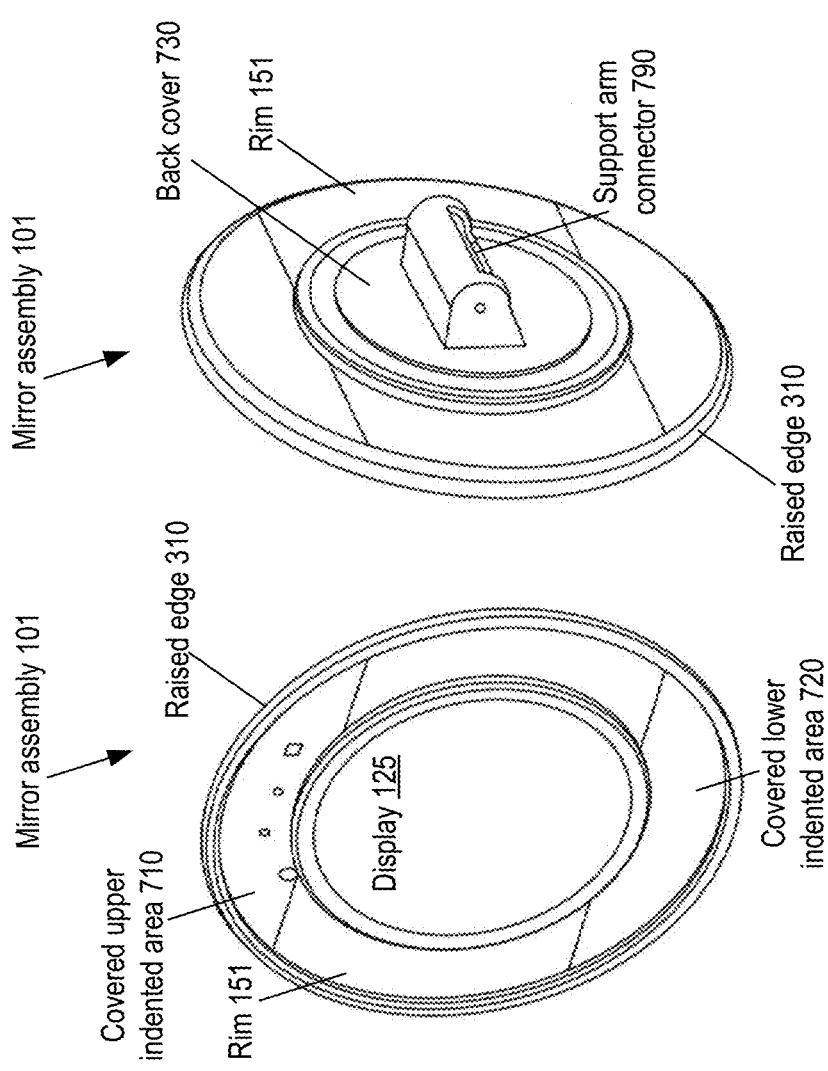
FIG. 6 is a front isometric view of a mirror assembly according to an alternative embodiment.
FIG. 7 is a back isometric view of the mirror assembly according to the alternative embodiment.
FIG. 8 is a back view of the mirror assembly without a back cover according to one embodiment.

FIG. 6, FIG. 7, and FIG. 8 illustrate a mirror assembly 101 in several views. The mirror assembly 101 has the same components as the mirror assembly 100 in FIG. 1, except for the locations of the circuit modules on the rim. In the mirror assembly 101, a rim 151 includes indented areas at the front side to house the circuit modules. Each indented area has a depth less than the depth (i.e., thickness) of the rim 151. The camera sensing module 170 is located at an upper indented area of the rim 151, and the touch button module 180 is located at a lower indented area of the rim 151. The camera sensing module 170 and the touch button module 180 are covered to hide the circuitry from view. The rim 151 has the same angled back edge 910, the raised edge 310, the edge's front surface 312 as the rim 150 (FIG. 1-FIG. 4), and also has the same transparency as the rim 150. Referring to a front isometric view of the mirror assembly 101 shown in FIG. 6, the front side of the rim 151 includes a covered upper indented area 710 and a covered lower indented area 720 to house the camera sensing module 170 and the touch button module 180, respectively. FIG. 7 is a back isometric view of the mirror assembly 101 according to one embodiment. A back cover 730 covers the hollow center of rim 150 from the back side. A support arm connector 790 is attached to the back cover 730. The support arm connector 790 can be attached to a support arm, which can further be attached to a makeup machine, a base, and/or a wall mount. FIG. 7 also shows that the lower boundary line of the covered upper indented area 710 and the upper boundary line of the covered lower indented area 720, which are visible from the back side of the mirror assembly 101. It should be understood that these boundary lines are at the front side of the rim 151 and extend partially into the rim 151 without reaching the back side of the rim 151. These boundary lines are visible from the back side because the rim 151 is transparent. FIG. 8 is a back view of the mirror assembly 101 with the back cover 730 removed to show the control board 155. The mirror assembly 101 has the same control board 155 as the mirror assembly 100.

Figure 9:
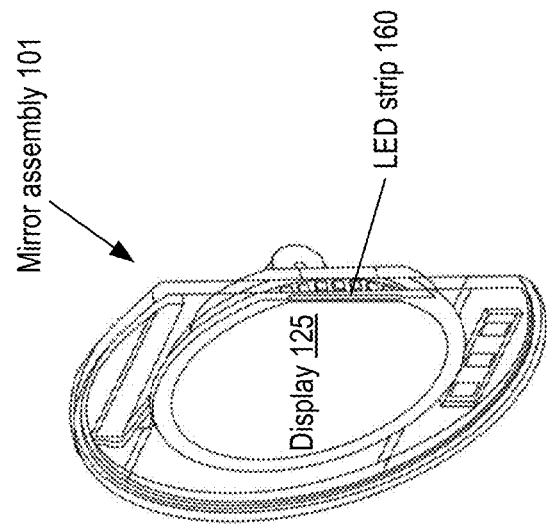
FIG. 9 is a cutaway diagram showing an LED strip in the mirror assembly according to the alternative embodiment.
Figure 10:
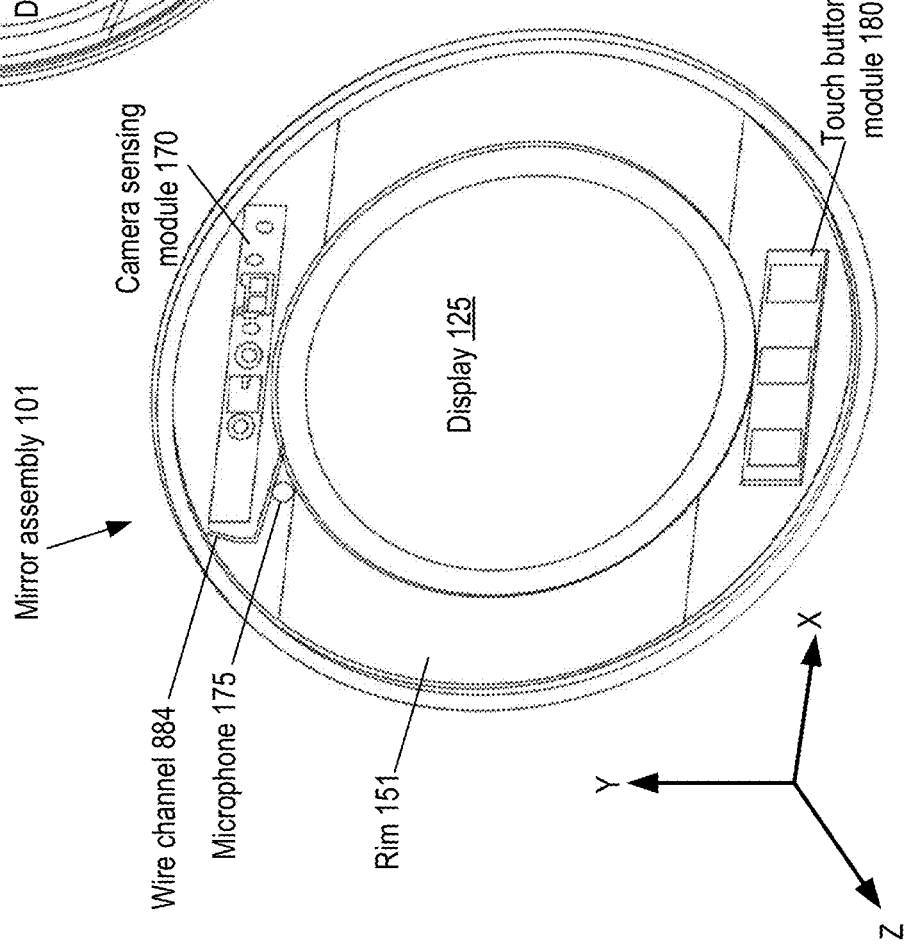
FIG. 10 illustrates electronic components embedded in a rim according to the alternative embodiment.

FIG. 9 is a cutaway diagram showing the LED strip 160 (FIG. 1) in the mirror assembly 101 according to one embodiment. As in the mirror assembly 100 of FIG. 1, the LED strip 160 is inserted into a circular groove in the cylinder 140 (FIG. 1). Referring also to FIG. 10, in which electronic components embedded in the indented areas of the rim 151 are shown. Non-limiting examples of the electronics components include the camera sensing module 170, a microphone 175, and the touch button module 180, all of which are electrically connected to the control board 155 via respective wires. FIG. 10 shows a wire channel 884 embedded in the rim 150. In an alternative embodiment, the wire channel 884 may have a different position, shape, and/or orientation than what is shown in FIG. 10. The wire channel 884 does not cut through the entire thickness of the rim 151. The wires from the camera sensing module 170 and the microphone 175 go through the wire channel 884 and the hollow center of the rim 151 to connect to the control board 155. In one embodiment, the wires go through the spacing between two adjacent LEDs to connect to the control board 155. A similar wire channel may be provided for the wires to connect the touch button module 180 to the control board 155. The wires from the touch button module 180 are routed through another wire channel and the hollow center via the spacing between two adjacent LEDs to reach the control board 155. Each wire channel has a depth less than the thickness of the rim 151.

Figure 11:
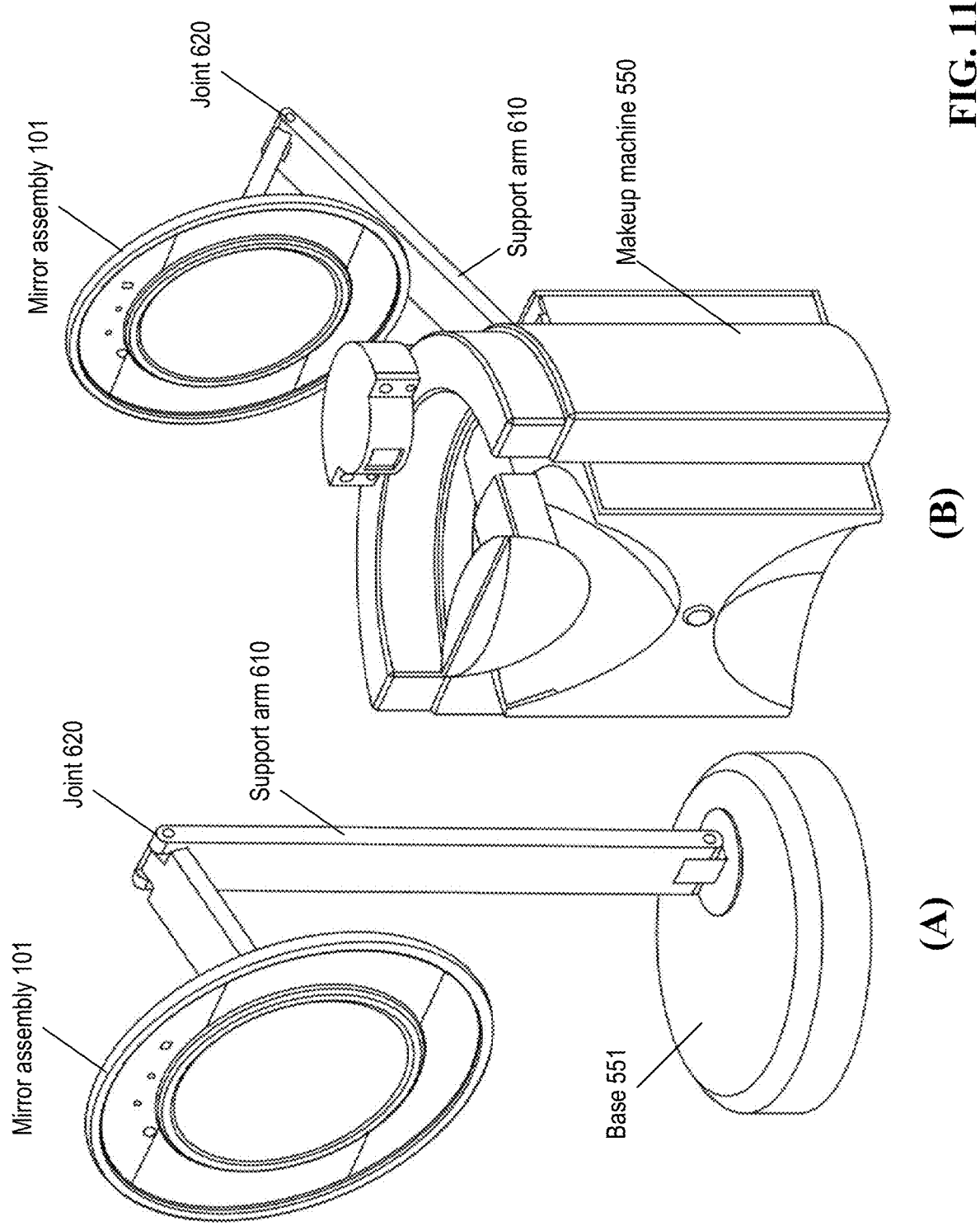
FIG. 11 illustrates the mirror assembly in various system configurations according to some alternative embodiments.

FIG. 11 illustrates the mirror assembly 101 in various system configurations according to some embodiments. Referring also to FIG. 5, the mirror assembly 101 may be attached to the machine 550, the base 551, and/or the wall mount 552. The mirror assembly 100 and the mirror assembly 101 may be mounted on support arms different from what are shown in FIG. 5 and FIG. 11, respectively. In (A) of FIG. 11, the mirror assembly 101 is mounted on a support arm 610 attached to the base 551 (FIG. 5). The support arm 610 includes a joint 620 that allows a user to adjust the height of the display 125. The support arm 610 is connected to the based 551 with a base connector that allows the user to rotate the support arm 610 on the base 551 and thereby adjusting the angle of the display 125. In (B), the mirror assembly 101 is attached to a machine, such as the makeup machine 550 (FIG. 5). The mirror assembly 100 is mounted on the support arm 610 secured to the back side of the machine body, and may be folded down on top of the machine 550 when not in use. In one embodiment, the mirror assembly 101 and the support arm 610 (as well as the mirror assembly 100 and the support arm 510) may be packaged and sold as a separate module from the rest of the makeup machine 550.

Embodiments of a mirror assembly have been described. In one embodiment, an apparatus of a mirror assembly includes a transparent rim. The rim has an outer perimeter and an inner perimeter that defines a hollow center. The rim has an angled edge surrounding the outer perimeter at a back side, and a raised edge that protrudes forward to define an edge's front surface that surrounds the outer perimeter of the rim at a front side. The apparatus also includes a display, which further includes a digital display panel that covers the front side of the hollow center. The apparatus also includes light sources disposed behind the display to project light that propagates from the inner perimeter of the rim radially outwards within the rim. The light is re-directed by the angled edge of the rim to exit the rim from the edge's front surface.

In one embodiment, the light sources are an LED strip surrounded by a diffuser ring with an air gap in between. The light projected by the light sources creates a circular floating halo at the edge's front surface with unlit circular space of the rim between the raised edge and the display. The light projected by the light sources propagates via an unobstructed L-shaped light passage within the rim. The L-shaped light passage extends from the inner perimeter to the angled edge and continues to the edge's front surface. In one embodiment, the angled edge has a coated and texturized surface. A camera sensing module may be attached to the front side of the rim to capture an image of a user. A touch button module may be attached to the front side of the rim to receive user input of light control. In one embodiment, the light control includes at least one of: light temperature control, brightness intensity adjustment, light on/off, and a cycle function. In one embodiment, the apparatus includes processors operative to adjust the light based on software applications being executed by the processors.

In one embodiment, the apparatus includes a circuit board behind the display. The circuit board includes circuitry to control operations of the display, the light sources, and circuitry that processes input/output signals. In one embodiment, the circuit board is connected to electronic circuitry at the front side of the rim via wires that go through the spacing between two adjacent light sources. The circuit board may include circuitry that performs image processing with augmented reality functions to guide a user during a makeup process.

In one embodiment, the apparatus includes a cylinder having a front circular ring to receive a front cover ring that surrounds the display, and a back end that extends through the hollow center of the rim to receive a back cover ring. The back cover ring, the front cover ring, and the cylinder hold the rim in place without a screw drilling into the rim. The light sources are an LED strip located in a first circular groove of the back end of the cylinder, and a diffuser ring over the LED strip is located in a second circular groove of the back end of the cylinder. In one embodiment, the rim includes at least an indented area at the front side to house electronic circuitry. The depth of the indented area is less than a thickness of the rim measured from the front side to the back side of the rim. In one embodiment, the rim includes at least an indented channel at the front side to route wires through the hollow center of the rim. The depth of the indented channel is less than a thickness of the rim measured from the front side to the back side of the rim.

In another embodiment, an apparatus includes a transparent rim. The rim has an outer perimeter and an inner perimeter that defines a hollow center. The rim has an angled edge surrounding the outer perimeter at a back side, and a raised edge that protrudes forward to define an edge's front surface that surrounds the outer perimeter of the rim at a front side. The apparatus also includes light sources disposed in the hollow center of the rim to project light that propagates from the inner perimeter of the rim radially outwards within the rim. The light is re-directed by the angled edge of the rim to exit the rim from the edge's front surface. The light projected by the light sources propagates via an unobstructed L-shaped light passage within the rim. The L-shaped light passage extends from the inner perimeter to the angled edge and continues to the edge's front surface. The light projected by the light sources creates a circular floating halo at the edge's front surface with unlit circular space of the rim between the raised edge and the inner perimeter of the rim. In one embodiment, the angled edge has a coated and texturized surface.

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An apparatus comprising:
a rim having an outer perimeter and an inner perimeter that defines a hollow center, wherein the rim has an angled edge surrounding the outer perimeter at a back side, and a raised edge that protrudes forward to define an edge's front surface that surrounds the outer perimeter of the rim at a front side, and wherein the rim is transparent;
a display including a digital display panel that covers the front side of the hollow center;
a plurality of light sources behind the display to project light that propagates from the inner perimeter of the rim radially outwards within the rim, wherein the light is re-directed by the angled edge to exit the rim from the edge's front surface; and
a cylinder with a center hole aligned with the hollow center of the rim, wherein the plurality of light sources are placed between the cylinder and the inner perimeter of the rim, and wherein the cylinder is tightened to a front cover ring that surrounds the display at the front side of the rim, and extends from the front side through the hollow center of the rim to attach to a back housing to thereby press the rim in place, without screws, from both the front side and the back side.

2. The apparatus of claim 1, wherein the light projected by the light sources creates a circular floating halo at the edge's front surface with unlit circular space of the rim between the raised edge and the display.

3. The apparatus of claim 1, wherein the light projected by the light sources propagates via an unobstructed L-shaped light passage within the rim, the L-shaped light passage extends from the inner perimeter to the angled edge and continues to the edge's front surface.

4. The apparatus of claim 1, wherein the light sources are a light-emitting diode (LED) strip surrounded by a diffuser ring with an air gap in between.

5. The apparatus of claim 1, further comprising:
a camera sensing module attached to the front side of the rim to capture an image of a user.

6. The apparatus of claim 1, further comprising:
a touch button module attached to the front side of the rim to receive user input of light control.

7. The apparatus of claim 6, wherein the light control includes at least one of:
light temperature control, brightness intensity adjustment, light on/off, and a cycle function.

8. The apparatus of claim 1, further comprising:
processors operative to adjust the light based on software applications being executed by the processors.

9. The apparatus of claim 1, further comprising:
a circuit board behind the display, wherein the circuit board includes circuitry to control operations of the display, the light sources, and circuitry that processes input/output signals.

10. The apparatus of claim 9, wherein the circuit board includes circuitry that performs image processing with augmented reality functions to guide a user during a makeup process.

11. The apparatus of claim 1, wherein the angled edge has a coated and texturized surface.

12. The apparatus of claim 1, wherein the cylinder further comprises
a front circular ring to receive the front cover ring that surrounds the display, and a back end that extends through the hollow center of the rim to receive the back housing, wherein the back housing, the front cover ring, and the cylinder hold the rim in place without a screw in the rim.

13. The apparatus of claim 1, wherein the light sources are a light-emitting diode (LED) strip located in a first circular groove of the back end of the cylinder, and a diffuser ring over the LED strip is located in a second circular groove of the back end of the cylinder.

14. The apparatus of claim 1, wherein the rim includes at least an indented area at the front side to house electronic circuitry, and wherein a depth of the indented area is less than a thickness of the rim measured from the front side to the back side of the rim.

15. The apparatus of claim 1, wherein the rim includes at least an indented channel at the front side to route wires through the hollow center of the rim, and wherein a depth of the indented channel is less than a thickness of the rim measured from the front side to the back side of the rim.

16. An apparatus comprising:
a rim having an outer perimeter and an inner perimeter that defines a hollow center, wherein the rim has an angled edge surrounding the outer perimeter at a back side, and a raised edge that protrudes forward to define an edge's front surface that surrounds the outer perimeter of the rim at a front side, and wherein the rim is transparent; and
a plurality of light sources disposed in the hollow center of the rim to project light that propagates from the inner perimeter of the rim radially outwards within the rim, wherein the light is re-directed by the angled edge to exit the rim from the edge's front surface,
wherein the rim includes at least an indented area at the front side to house electronic circuitry, and wherein a depth of the indented area is less than a thickness of the rim measured from the front side to the back side of the rim.

17. The apparatus of claim 16, wherein the angled edge has a coated and texturized surface.

18. The apparatus of claim 16, wherein the light projected by the light sources creates a circular floating halo at the edge's front surface with unlit circular space of the rim between the raised edge and the inner perimeter of the rim.

19. The apparatus of claim 16, wherein the light projected by the light sources propagates via an unobstructed L-shaped light passage within the rim, the L-shaped light passage extends from the inner perimeter to the angled edge and continues to the edge's front surface.

20. An apparatus comprising:
   a rim having an outer perimeter and an inner perimeter that defines a hollow center, wherein the rim has an angled edge surrounding the outer perimeter at a back side, and a raised edge that protrudes forward to define an edge's front surface that surrounds the outer perimeter of the rim at a front side, and wherein the rim is transparent;
   a display including a digital display panel that covers the front side of the hollow center; a plurality of light sources behind the display to project light that propagates from the inner perimeter of the rim radially outwards within the rim, wherein the light is re-directed by the angled edge to exit the rim from the edge's front surface; and
   a circuit board behind the display, wherein the circuit board includes circuitry to control operations of the display, the light sources, and circuitry that processes input/output signals, wherein the circuit board is connected to electronic circuitry at the front side of the rim via wires that go through spacing between two adjacent light sources.

\* \* \* \* \*